United States Patent
Seeberg

(10) Patent No.: US 10,393,560 B2
(45) Date of Patent: Aug. 27, 2019

(54) MASS FLOW METER INCLUDING A FLEXIBLE PLATE

(71) Applicant: General Electric Company, Schenectady, NY (US)

(72) Inventor: Bjørn Erik Seeberg, Oslo (NO)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 246 days.

(21) Appl. No.: 15/449,472

(22) Filed: Mar. 3, 2017

(65) Prior Publication Data

US 2018/0252562 A1 Sep. 6, 2018

(51) Int. Cl.
  *G01F 1/84* (2006.01)
(52) U.S. Cl.
  CPC .................. *G01F 1/8459* (2013.01)
(58) Field of Classification Search
  None
  See application file for complete search history.

(56) References Cited

U.S. PATENT DOCUMENTS

| | | | | |
|---|---|---|---|---|
| 4,420,983 A | * | 12/1983 | Langdon | G01F 1/66 73/32 A |
| 2009/0126509 A1 | * | 5/2009 | Simonsen | G01F 1/8409 73/861.355 |
| 2011/0088486 A1 | * | 4/2011 | Keita | G01F 1/8495 73/861.355 |
| 2011/0167907 A1 | * | 7/2011 | Bitto | G01F 1/84 73/32 A |
| 2015/0027236 A1 | * | 1/2015 | Yoder | G01F 1/76 73/861.357 |

FOREIGN PATENT DOCUMENTS

GB 2071848 A 9/1981

OTHER PUBLICATIONS

T. Wang and R. Baker., "Coriolis flowmeters: a review of developments over the past 20 years, and an assessment of the state of the art and likely future directions", *Flow Measurement and Instrumentation*, 40 (2014) 99-123.

* cited by examiner

*Primary Examiner* — Harshad R Patel
(74) *Attorney, Agent, or Firm* — Mintz Levin Cohn Ferris Glovsky and Popeo, P.C.

(57) ABSTRACT

A mass flow meter and methods for using the same are provided. The mass flow meter can include a tubular housing, a flexible plate, an actuator, and at least two sensors. The flexible plate can be coupled to an interior wall of the tubular housing such that the flexible plate can vibrate in torsion. The actuator can be configured to apply an oscillating torque to the flexible plate sufficient to vibrate the flexible plate in torsion. The at least two sensors can each be configured to measure oscillations of the flexible plate as a function of time at different locations. The mass flow meter can also include a computing device in electrical communication with the at least two sensors and configured to determine a mass flow of fluid passing through the tubular housing from a phase shift between oscillations of the flexible plate measured by the at least two sensors.

17 Claims, 7 Drawing Sheets

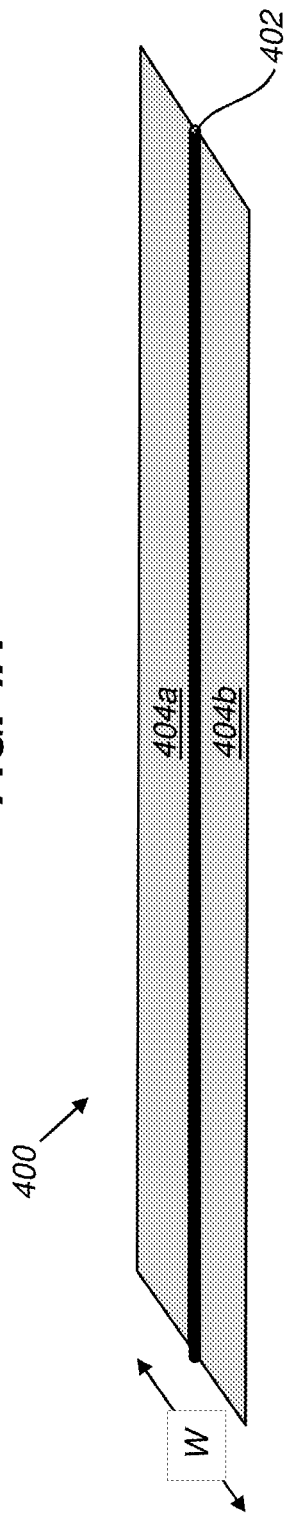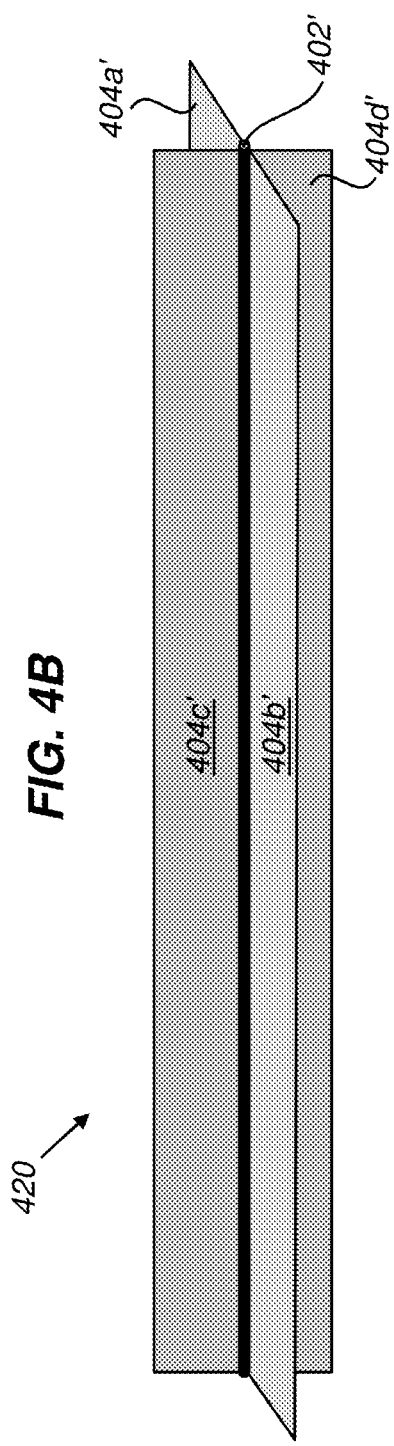
FIG. 4A
FIG. 4B

MASS FLOW METER INCLUDING A FLEXIBLE PLATE

BACKGROUND

Pipelines are often employed to transport fluids such as petroleum products, natural gas, and water. Fluid flow measurements are often performed at selected pipeline locations to quantify an amount of fluid moving through a pipeline in real-time. While fluid flow can be measured on the basis of volume or mass, mass flow measurements can be preferred. As an example, mass flow measurements can be more accurate than volume flow measurements because, unlike volume, mass does not vary due to changes in pressure or temperature.

While mass flow meters have been developed for direct mass flow measurement of low pressure fluids, these devices can be unsuitable for use with high pressure fluids. As a result, techniques for indirectly measuring mass flow of high pressure fluids have been developed based upon differential pressure and/or density of the fluid. However, because fluid density can be difficult to measure accurately, the accuracy of these indirect mass flow measurements can also suffer.

SUMMARY

In general, systems and methods are provided for measurement of mass flow of fluids.

In one embodiment, a mass flow meter is provided and can include a tubular housing, a flexible plate, an actuator, and at least two sensors. The tubular housing can extend along a longitudinal axis and it can be configured to receive a flow of fluid therethrough. The flexible plate can have a length positioned along the longitudinal axis and it can be at least partially coupled to an interior wall of the tubular housing such that the flexible plate can vibrate in torsion. The actuator can be configured to apply an oscillating torque to the flexible plate sufficient to vibrate the flexible plate in torsion. The at least two sensors can each be configured to measure oscillations of the flexible plate as a function of time at different locations arising from the applied oscillating torque.

In certain embodiments, the mass flow meter can include a computing device in electrical communication with the at least two sensors. The computing device can be configured to determine a mass flow of fluid passing through the tubular housing based upon a phase shift between the oscillations of the flexible plate measured by the at least two sensors.

The tubular housing can have a variety of configurations. In one embodiment, a length of the tubular housing can extend between a housing inlet and a housing outlet and the tubular housing can be substantially straight therebetween.

The flexible plate can also have a variety of configurations. In one embodiment, the flexible plate can be configured to deform elastically when vibrating. In certain aspects, a width of the flexible plate can be approximately equal to an inner diameter of the tubular housing. In another aspect, the flexible plate can be at least partially coupled to the tubular housing at opposed longitudinal ends of the flexible plate. In another aspect, the flexible plate can include at least one vane extending radially outward from a hollow shaft. In another aspect, the flexible plate can include four vanes.

In another embodiment, the actuator can be configured to apply the oscillating torque at about a longitudinal center of the flexible plate of the flexible plate.

In another embodiment, the actuator can be configured to apply the oscillating torque to the hollow shaft of the flexible plate.

The at least two sensors can also have a variety of configurations. In one embodiment, the at least two sensors can be configured for measurement of the oscillations at approximately symmetric locations on each side of a longitudinal center of the flexible plate.

Methods for measuring mass flow through a tubular housing are also provided. In one embodiment, a method can include driving a flexible plate within a tubular housing to vibrate in a torsional mode at a selected frequency, receiving a flow of fluid within the tubular housing, measuring a plurality of oscillations of the vibrating flexible plate as a function of time at two different positions along a length of the flexible plate, and determining a mass flow of the fluid within the tubular housing based upon a phase shift between the oscillations measured at the two different positions.

In one embodiment, the flexible plate can include opposed longitudinal ends that are attached to an inner wall of the tubular housing.

In another embodiment, driving the flexible plate can include applying an oscillating torque at about a longitudinal center of the flexible plate. In another embodiment, the selected frequency can be a resonance frequency of the flexible plate.

In other aspects, the oscillations can be measured at approximately symmetric locations on each side a longitudinal center of the flexible plate.

In another embodiment, the flexible plate can deform elastically in vibration.

In another embodiment, the flexible plate can include at least one vane extending radially outward from a hollow shaft and the flexible plate can be driven to vibrate in a torsional mode by applying an oscillating torque to the hollow shaft.

In another embodiment, the flexible plate can include four vanes.

DESCRIPTION OF DRAWINGS

These and other features will be more readily understood from the following detailed description taken in conjunction with the accompanying drawings, in which:

FIG. 4A is a perspective view of an embodiment of the flexible plate including two vanes;

FIG. 4B is a perspective view of an embodiment of the flexible plate including four vanes;

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Mass flow meters can operate by vibrating a pipe carrying a flowing fluid between an inlet and an outlet. The vibration of the pipe can be described by an oscillation, a variation of a measure of the pipe (e.g., position) about a central value. The mass of the flowing fluid resists the vibration motion and causes the pipe to twist. This twist results in a time lag (phase shift) of oscillations of the pipe between the inlet side and the outlet side and this phase shift is directly affected by the mass passing through the tube. However, high pressure fluids are often transported in thick walled pipes that can be difficult to vibrate with sufficient strength for these types of measurements. Accordingly, a mass flow meter is provided that includes a tubular housing containing a flexible plate that vibrates in a twisting manner (torsion). The vibration of the plate is altered by fluid flow therethrough. By measuring oscillations of the flexible plate at different locations, a phase lag of the plate oscillations can be measured and related to mass flow of a fluid traveling through the tubular housing, regardless of its thickness. Other embodiments are within the scope of the disclosed subject matter.

Embodiments of the disclosure are discussed herein with respect to measurement of mass flow of fluids flowing through pipes. However, a person skilled in the art will appreciate that the disclosed embodiments can be employed to measure mass flow in other structures and/or geometries without limit.

Figure 1:
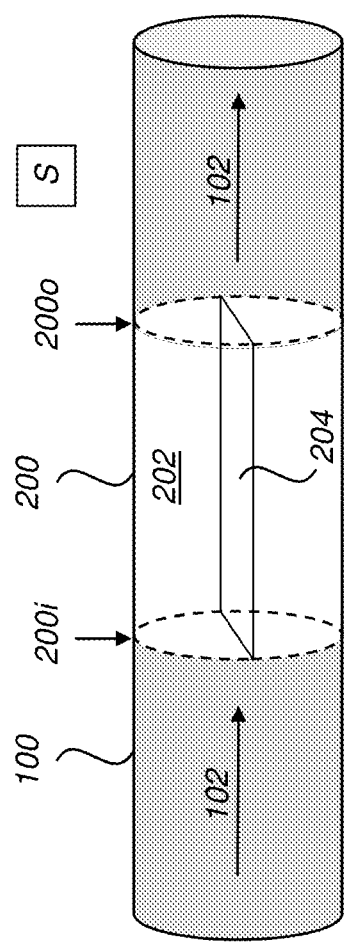
FIG. 1 is a perspective view of one exemplary embodiment of a mass flow meter including a tubular housing and flexible plate positioned within the tubular housing.

FIG. 1 illustrates one exemplary embodiment of a fluid channel 100 (e.g., a pipe or pipeline) containing a flowing fluid 102 and a mass flow meter 200 at least partially coupled thereto at respective ends. In certain aspects, the fluid channel 100 can be positioned within a surrounding environment S, such as a subsea environment. As discussed in detail below, the mass flow meter 200 can include a tubular housing 202 and a flexible plate 204 configured to vibrate in torsion such that measurement of the movement of the flexible plate 204 can be related to mass flow of the fluid 102. Thus, regardless of the geometry of the tubular housing 202, mass flow can be measured directly by the mass flow meter 200.

Figure 2:
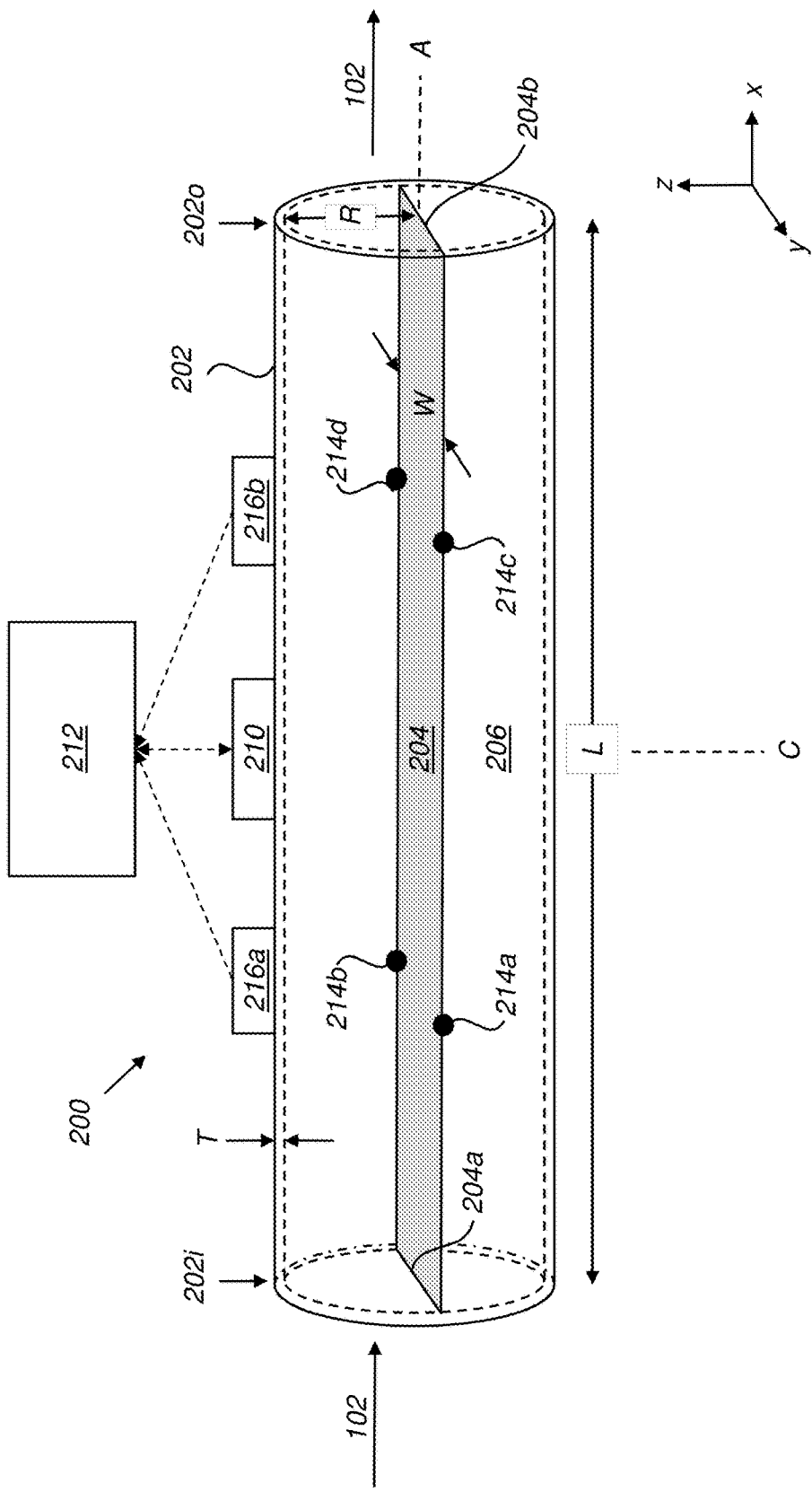
FIG. 2 is a side view of the mass flow meter of FIG. 1 with the flexible plate in an unactuated position.

FIG. 2 illustrates the mass flow meter 200 in more detail. As shown, the tubular housing 202 can be in the form of a generally circular cylinder having a length L, a wall thickness T, and an inner radius R defining a cavity 206. The length L of the tubular housing 202 and the cavity 206 can extend along a longitudinal axis A between a housing inlet 202i and a housing outlet 202o positioned at the opposed terminal ends of the tubular housing 202. In certain aspects, the tubular housing 202 can be substantially straight between the housing inlet 202i and the housing outlet 202o.

The tubular housing 202 can be any tubular geometry formed by any process and material. In certain aspects, the geometry and/or materials of the tubular housing 202 can be approximately the same as that of the fluid channel 100. The tubular housing 202 can be formed from any suitable materials including, for example, polymers, ceramics, metals, and metal alloys (e.g., steels, copper and copper alloys, aluminum and aluminum alloys, etc.).

The housing inlet 202i and the housing outlet 202o can also be configured to form a fluid-tight coupling (not shown) with the fluid channel 100 or any other fluid conveying systems (e.g., pumps, dispensers, etc.). Examples of fluid-tight couplings can include, but are not limited to, threaded engagements, clamps, welds, and the like. One skilled in the art will appreciate that alternative embodiments of the mass flow meter 200 can be integrally formed with the fluid channel 100.

FIG. 2 also illustrates the flexible plate 204 positioned within the cavity 206. The flexible plate 204 can extend in the direction of the longitudinal axis A of the tubular housing 202 and it can be at least partially coupled to an interior wall of the tubular housing 202 (e.g., a wall of the cavity 206) at one or more locations. As an example, a first terminal end 204a of the flexible plate 204 can be at least partially coupled to the tubular housing 202 at or near the housing inlet 202i and a second terminal end 204b of the flexible plate 204 can be at least partially coupled to the tubular housing 202 at or near the housing outlet 202o. One skilled in the art will appreciate that the flexible plate can alternatively be mounted to the tubular housing at a single one of the terminal ends of the flexible plate. In further embodiments, more than one flexible plate 204 can be positioned within the housing (not shown).

As shown in FIG. 2, the flexible plate 204 can be in the form of a substantially planar plate. A width W of the flexible plate 204 can be approximately equal to an inner diameter (2R) of the tubular housing 202 such that any gap between the wall of the cavity 206 and the flexible plate 204 is small and does not allow a significant amount of the fluid 102 to pass between opposite edges of the flexible plate 204 (e.g., vertically in FIG. 2). Alternatively the flexible plate can adopt a curved shape in an undeformed or unflexed state (not shown).

The mass flow meter 200 can further include an actuator 210. As shown in FIG. 2, the actuator 210 can be positioned outside the tubular housing 202 (e.g., on or adjacent to an outer surface of the tubular housing 202) and at about a longitudinal center of the flexible plate 204. One skilled in the art will appreciate that alternative embodiments of the flow meter (not shown) can place the actuator at different longitudinal and/or radial positions. As an example, the actuator can be positioned fully or partially within the cavity of the tubular housing.

The actuator 210 can be configured to apply an oscillating torque to the flexible plate 204 to drive the flexible plate to vibrate in a torsional mode at a selected frequency. In certain aspects, the actuator 210 can be an electromagnetic actuator and at least a portion of the flexible plate 204 can be formed from a magnetic material (e.g., metals, metal alloys, steels, polymers, etc.). As an example, the flexible plate 204 can include one or more embedded permanent magnets. The actuator 210 can also be in electrical communication with a computing device 212. The computing device 212 can control an electrical current to the actuator 210 to generate one or more magnetic fields that apply the oscillating torque to the flexible plate 204 sufficient to drive the flexible plate 204 to vibrate in torsion at the selected frequency. In certain aspects, the frequency of vibration can be a resonance frequency of the flexible plate 204. In other embodiments, the actuator 210 can be configured to receive feedback from one or more of the sensors to drive the flexible plate 204 at resonance.

The mass flow meter 200 can also include a plurality of sensors configured to measure movement of the flexible plate 204 as a function of time at positions upstream and downstream of the longitudinal center C with respect to the flow of fluid 102. The movement of the flexible plate 204 can be characterized by any parameter of the flexible plate 204 that oscillates as a function of time when the flexible plate 204 vibrates in torsion. Example parameters can include, but are not limited, linear and/or angular parameters such as position, speed, acceleration, and displacement. In certain embodiments, angle, angular speed, and angular acceleration can be measured. In other aspects, stress and/or strain can be measured. Each of the sensors can include a first sensor portion 214 (e.g., 214a, 214b, 214c, 214d) and a plurality of corresponding second sensor portions 216 (e.g., 216a, 216b). As an example, first sensor portions 214 can be a permanent magnetic material positioned on an outer surface of the flexible plate 204 or embedded at least partially within the flexible plate 204 that generate magnetic fields. Second sensor portions 216 can be magnetic pickup sensors including a pickup coil in electrical communication with the computing device 212. Vibration of the flexible plate 204 produces a current within the pickup coil due to variation of the magnetic fields generated by first sensor portions 214 at second sensor portions 216. The current output by each second sensor portion 216 can be affected by a speed of first sensor portion 214 and/or a separation distance from first sensor portion 214 inducing the current within its pickup coil. The computing device 212 can maintain a calibration, allowing the current output to be converted to measurements of the oscillating parameter of the flexible plate 204 as a function of time at the position of each first sensor portion 214.

The placement of each first sensor portion 214 can vary along the length and width of the flexible plate 204. As shown in FIG. 2, first sensor portions 214a, 214b can be positioned at opposed lateral edges of the flexible plate 204 and upstream of the longitudinal center C. First sensor portions 214c, 214d can be positioned at opposed lateral edges of the flexible plate 204 and downstream of the longitudinal center C. In certain aspects, placement of upstream first sensor portions 214a, 214b and downstream first sensor portions 214c, 214d can be approximately symmetric with respect to the longitudinal center C. As an example, first sensor portions 214a, 214b can be positioned approximately equidistant between the actuator 210 and the first terminal end 204a of the flexible plate 204 and at opposed lateral edges. Similarly, first sensor portions 214c, 214d can be positioned approximately equidistant between the actuator 210 and the second terminal end 204b of the flexible plate 204. In this manner, first sensor portions 214a, 214d can be positioned along one common lateral edge of the flexible plate 204 and first sensor portions 214b, 214c can be positioned along another common lateral edge of the flexible plate 204.

Figure 3:
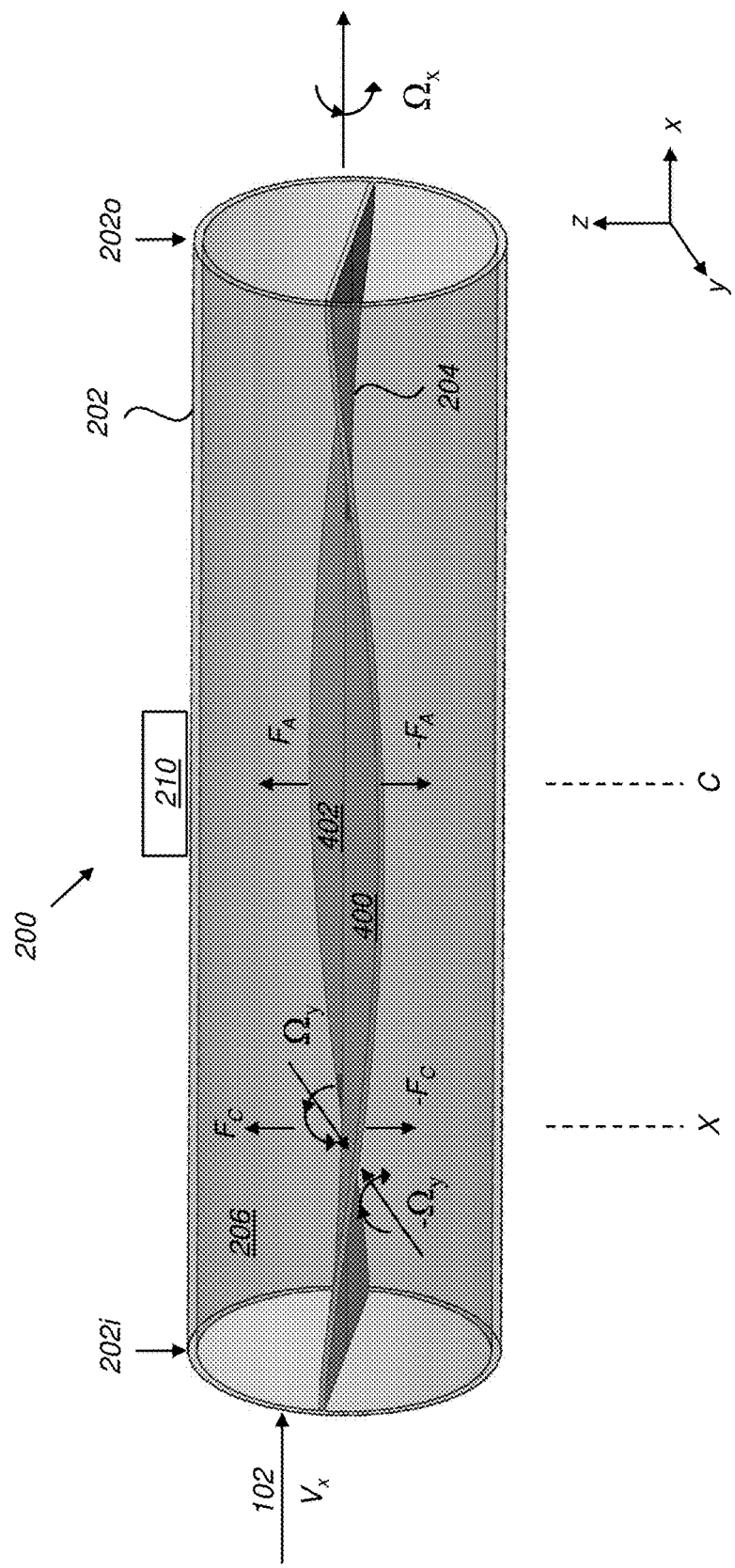
FIG. 3 is a side view of the mass flow meter of FIG. 1 with the flexible plate in an actuated, twisted position.

FIG. 3 illustrates the mass flow meter 200 with the flexible plate 204 in torsion due to an applied torque, with reference to orthogonal axes x, y, z. As shown, the longitudinal axis A is parallel to the x-axis. The actuator 210 can apply the torque by exerting forces $F_A$ of opposite sign parallel to the y-axis and along the width of the flexible plate (e.g., on opposed lateral edges of the flexible plate 204). By varying the magnitude and sign of the applied force $F_A$, the torque oscillates and drives the flexible plate 204 to vibrate in a torsional mode. This torsional vibration can cause the flexible plate 204 to rotate about the x-axis with an angular velocity $\Omega_x$ parallel to the x-axis, and to rotate about the y-axis with an angular velocity $\Omega_y$ parallel to the y-axis. For example, examining a longitudinal location X approximately equidistant between the housing inlet 202i and the longitudinal center C, the angular velocity in a first longitudinal half 400 of the flexible plate 204 points in the negative y-direction (into the page) and the angular velocity in a second longitudinal half 402 of the flexible plate 204 points in the positive y-direction (out of the page).

The mass flow meter 200 can measure mass flow of the fluid 102 flowing through the cavity 206 by the Coriolis Effect. In brief, the Coriolis Effect refers to an inertial force (also referred to as the Coriolis force) that acts on objects in motion relative to a rotating reference frame. The Coriolis force $F_C$ acts in a direction that is a cross-product of the axis of rotation and the direction of motion of the object. That is, the direction of the Coriolis force is perpendicular to the axis of rotation and the direction of motion of the object.

As shown in FIG. 3, there are two reference frames in rotation due to the torque applied to the flexible plate 204, one about the x-axis and one about the y-axis. The object in motion in each rotating reference frame is the fluid 102 having a velocity $V_x$ parallel to the x-axis. Accordingly, there cannot be a Coriolis force arising from flow of the fluid 102 parallel to the x-axis with regard to the reference frame rotating about the x-axis, since the axis of rotation is the same as the direction of flow of the fluid 102. However, there can be a non-zero Coriolis force for flow of the fluid 102 parallel to the x-axis with regard to the reference frame rotating about the y-axis. The cross-product of the axis of rotation (the y-axis) and the direction of motion of the fluid 102 (the x-axis) is in the direction of the z-axis. As also shown in FIG. 3, at the longitudinal location X, the direction of the Coriolis force is in the negative z-direction in the first longitudinal half 400 of the flexible plate 204 and in the positive z-direction in the second longitudinal half 402 of the flexible plate 204. The magnitude of the Coriolis force can vary with distance from the center of the width of the flexible plate 204.

The Coriolis force can be observed as a phase shift (time shift) in oscillations of the flexible plate 204 as a function of time at different locations along the length of the flexible plate 204. As discussed above, the oscillations can be any linear and/or angular parameter of the flexible plate 204 that oscillates due to the applied oscillating torque (e.g., position, angle, speed, acceleration, stress, strain, etc.). Thus, by measuring the oscillations of the flexible plate 204 as a function of time using the sensors positioned upstream and downstream of the longitudinal center C, the phase shift in the oscillations can be measured.

As discussed in greater detail below, the phase shift can be approximately proportional to the mass flow of the fluid 102. Thus, with calibration of the mass flow meter 200 to determine the proportionality constant, the measured phase shift can provide a direct measurement of mass flow of the fluid 102. In certain aspects, the computing device 212 can receive the proportionality constant and determine the phase shift from the oscillations measured by the sensors to determine the mass flow of the fluid 102.

In alternative embodiments, the number of sensors can be varied. As shown in FIG. 2, the mass flow meter 200 includes four first sensor portions 214a, 214b, 214c, 214d and two second sensor portions 216a, 216b. However, in certain embodiments, the mass flow meter can include a single sensor (e.g., a first sensor portion 214 and a second sensor portion 216) positioned either upstream or downstream of the longitudinal center C of the flexible plate. In this configuration, the phase shift can be determined between the applied oscillating torque and the oscillation measured by the single sensor.

FIGS. 4A-4B illustrate alternative embodiments of flexible plates 400, 420, that include one or more vanes. The flexible plates 400, 420 can be mounted within the mass flow meter 200 and include first sensor portions 214 as discussed above with respect to flexible plate 204. As shown in FIGS. 4A-4B, the flexible plate 400 can include a shaft 402 and two vanes 404a, 404b extending radially outward therefrom at about 180° with respect to one another. The flexible plate 420 can include a shaft 402' and four vanes 404a', 404b', 404c', 404d' extending radially outward therefrom at about 90° with respect to one another. The vanes can possess approximately equal width. In certain embodiments, the shaft 402, 402' can be hollow. An oscillating torque can be applied to the shaft 402, 402' (e.g., internal to the shaft when hollow) to cause the flexible plates 400, 420 to vibrate. One skilled in the art will appreciate that the number of vanes and the angle between the vanes can be varied as necessary. As an example, the number of vanes can vary from a minimum of one to any desired number.

Figure 5C:
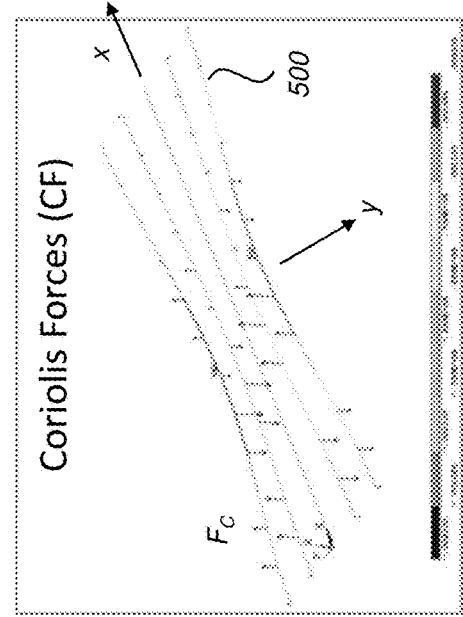
FIG. 5C is a perspective view of Coriolis forces applied to a finite element model of the flexible plate.
Figure 5D:
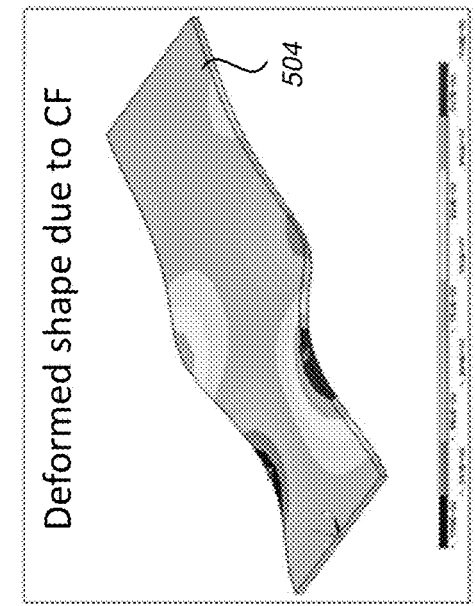
FIG. 5D is a perspective view showing a simulated deformed shape of the flexible plate of FIG. 5C due to the applied Coriolis forces.
Figure 5A:
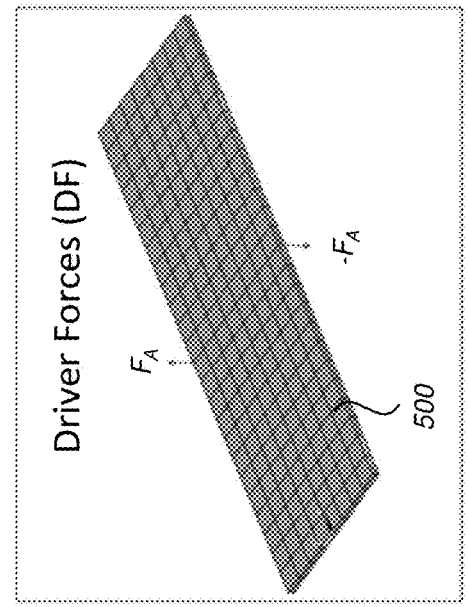
FIG. 5A is a perspective view of driver forces applied to a finite element model of a flexible plate.
Figure 5B:
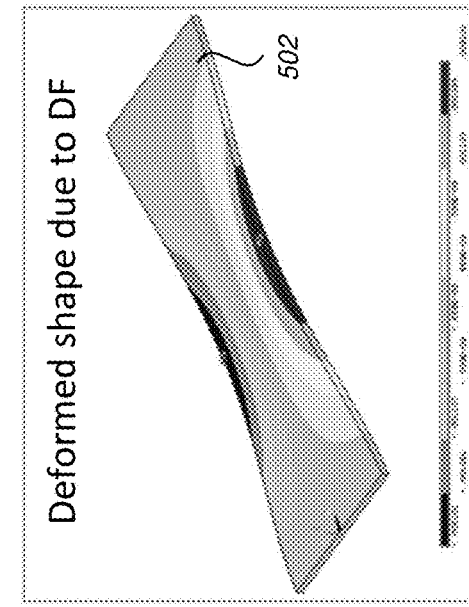
FIG. 5B is a perspective view showing a simulated deformed shape of the flexible plate of FIG. 5A due to the applied driver forces.

FIGS. 5A-5D illustrate deformation of the flexible plate 500 predicted from a finite element analysis (FEA) model simulating vibrational motion. In the model, the flexible plate 500 is assumed to be formed from stainless steel having dimensions of 300 mm×100 mm×4 mm. As shown in FIG. 5A, forces $F_A$ are applied to the lateral edges of the flexible plate 500 at about a longitudinal center to simulate the application of an oscillating torque. In the simulation, the magnitude of $F_A$ is 10 N and a damping of $\zeta$=0.002 is assumed. The resulting deformed shape 502 of the flexible plate 500 is shown in FIG. 5B. FIG. 5C illustrates application of Coriolis forces $F_C$ to the flexible plate 500. The Coriolis forces are zero along the twist axis (x-axis) of the flexible plate 500 and at a maximum at the lateral edges of the flexible plate 500 with the most bending. FIG. 5D illustrates a deformed shape 504 resulting from application of the Coriolis forces. A sum of the deformations illustrated in FIGS. 5B and 5D represents the deformation of the flexible plate 500 under the influence of the driver force and the Coriolis force. The shading of FIGS. 5B and 5D represents out-of-plane linear displacement of the deformed shapes 502 and 504.

Figure 6:
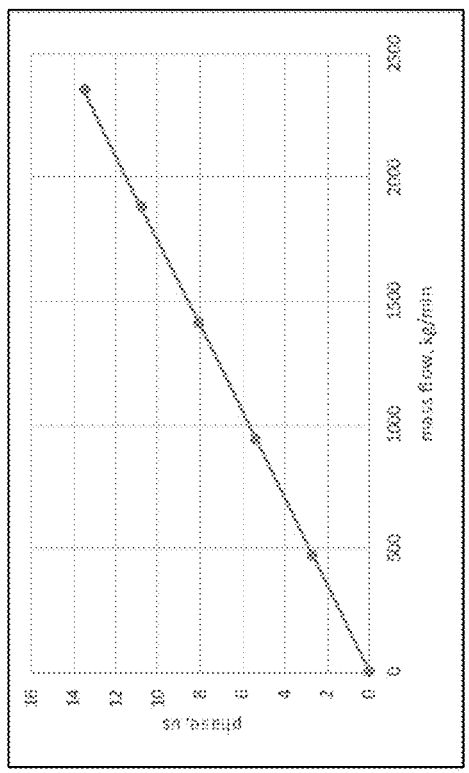
FIG. 6 is a graph illustrating one exemplary embodiment of a simulated phase shift as a function of mass flow for the mass flow meter of FIG. 2.

FIG. 6 illustrates one exemplary embodiment of a simulated phase shift as a function of mass flow. The phase shift can be calculated based upon oscillations along one lateral edge of the simulated flexible plate, approximately equidistant between the longitudinal center of the flexible plate and the opposed terminal ends (e.g., analogous to the location of 214a, 214c). As shown in FIG. 6, an approximately linear relationship between the simulated phase and mass flow is observed. This linear relationship is maintained over nearly 14 μs, which can be desirable and easily achieved in practice.

Figure 7:
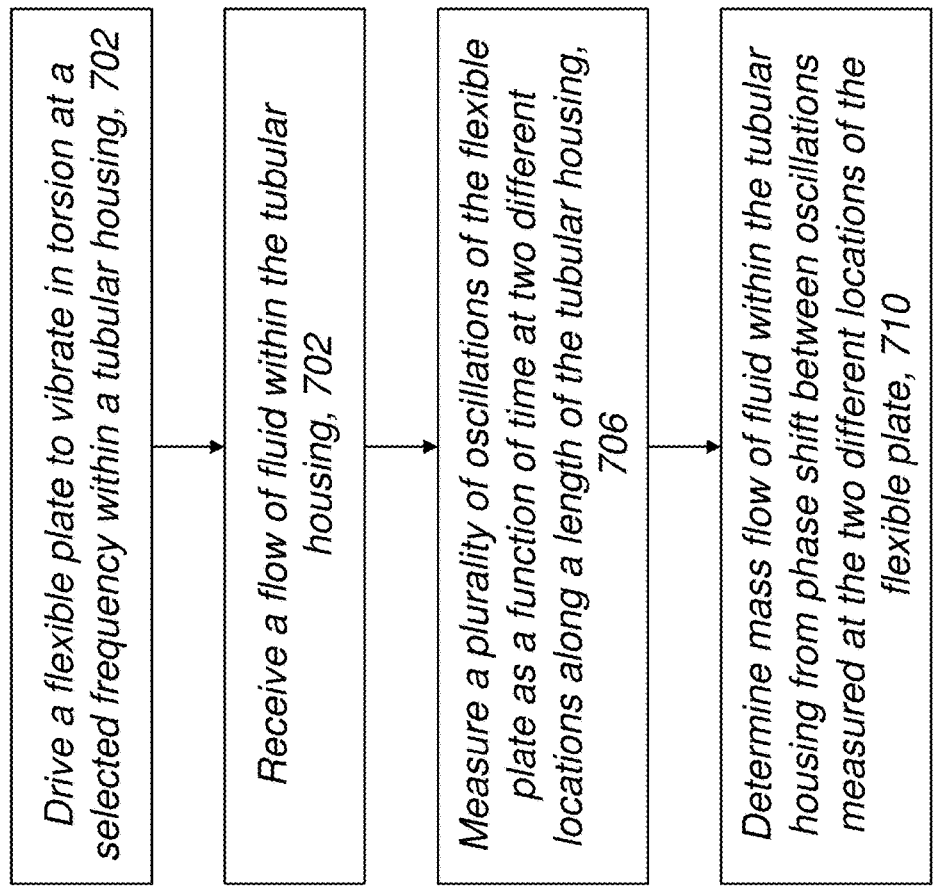
FIG. 7 is a flow diagram illustrating an exemplary embodiment of a method for measuring mass flow.

FIG. 7 is a flow diagram illustrating an exemplary embodiment of a method 700 for measuring mass flow. As shown, in operation 702, a flexible plate (e.g., flexible plate 204, 400, 420) can be driven to vibrate in torsion at a selected frequency within a tubular housing (e.g., tubular housing 202). In operation 704, a flow of fluid can be received within the tubular housing. The flow of fluid can be received before or after the flexible plate is driven to vibrate. In operation 706, a plurality of oscillations of the vibrating flexible plate can be measured as a function of time. The plurality of oscillations can be measured at two different locations along the length of the flexible plate (e.g., symmetrical about a longitudinal center of the flexible plate). In operation 710, a mass flow of the fluid within the tubular housing can be determined based upon a phase shift between the oscillations measured at the two different positions. Embodiments of the method 700 can perform the illustrated operations in a different order and add or omit operations as necessary.

Exemplary technical effects of the methods, systems, and devices described herein include, by way of non-limiting example, direct measurement of mass flow suitable for high wall thickness pipes and high pressure fluids.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A mass flow meter, comprising:
   a tubular housing extending along a longitudinal axis and configured to receive a flow of fluid therethrough;
   a flexible plate having a length positioned along the longitudinal axis and at least partially coupled to an interior wall of the tubular housing at opposed longitudinal ends of the flexible plate such that the flexible plate can vibrate in torsion;
   an actuator positioned on a surface of the tubular housing, the actuator configured to apply an oscillating torque to the flexible plate sufficient to vibrate the flexible plate in torsion; and
   at least two sensors each configured to measure a plurality of oscillations of the flexible plate as a function of time at different locations arising from the applied torque.

2. The mass flow meter of claim 1, further comprising a computing device in electrical communication with the at least two sensors and configured to determine a mass flow of fluid passing through the tubular housing based upon a phase shift between the oscillations of the flexible plate measured by the at least two sensors.

3. The mass flow meter of claim 1, wherein a length of the tubular housing extends between a housing inlet and a housing outlet and is substantially straight therebetween.

4. The mass flow meter of claim 1, wherein the flexible plate is configured to deform elastically when vibrating.

5. The mass flow meter of claim 1, wherein a width of the flexible plate is approximately equal to an inner diameter of the tubular housing.

6. The mass flow meter of claim 1, wherein the flexible plate includes at least one vane extending radially outward from a hollow shaft.

7. The mass flow meter of claim 6, wherein the flexible plate includes four vanes.

8. The mass flow meter of claim 6, wherein the actuator is configured to apply the oscillating torque to the hollow shaft of the flexible plate.

9. The mass flow meter of claim 1, wherein the actuator is configured to apply the oscillating torque at about a longitudinal center of the flexible plate.

10. The mass flow meter of claim 1, wherein the at least two sensors are configured for measurement of the oscillations at approximately symmetric locations on each side a longitudinal center of the flexible plate.

11. A method for measuring mass flow through a tubular housing, comprising:
- driving, by an actuator, a flexible plate within a tubular housing to vibrate in a torsional mode at a selected frequency, wherein the actuator is positioned on a surface of the tubular housing, and wherein the flexible plate includes opposed longitudinal ends that are attached to an inner wall of the tubular housing;
- receiving a flow of fluid within the tubular housing;
- measuring a plurality of oscillations of the vibrating flexible plate as a function of time at two different positions of the flexible plate; and
- determining a mass flow of the fluid within the tubular housing based upon a phase shift between the oscillations measured at the two different positions.

12. The method of claim 11, wherein driving the flexible plate comprises applying a torque at about a longitudinal center of the flexible plate.

13. The method of claim 11, wherein the selected frequency is a resonance frequency of the flexible plate.

14. The method of claim 11, wherein the oscillations are measured at approximately symmetric locations on each side a longitudinal center of the flexible plate.

15. The method of claim 11, wherein the flexible plate deforms elastically in vibration.

16. The method of claim 11, wherein the flexible plate includes at least one vane extending radially outward from a hollow shaft and the flexible plate is driven to vibrate in a torsional mode by applying an oscillating torque to the hollow shaft.

17. The method of claim 16, wherein the flexible plate includes four vanes.

* * * * *